Nov. 14, 1933.    T. FRANZEN    1,934,920
BEARING
Filed Dec. 4, 1931
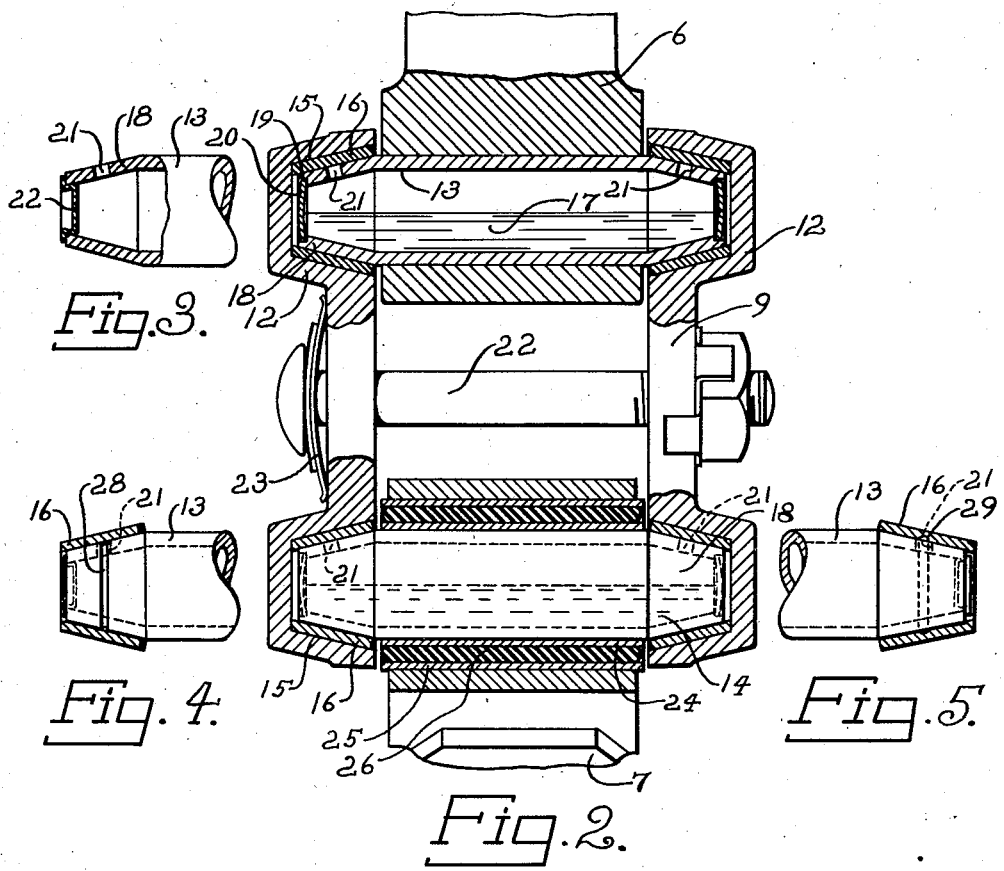
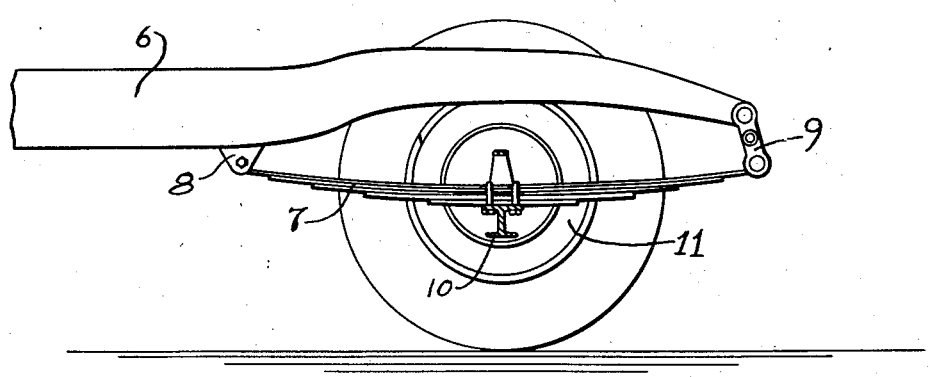
INVENTOR.
TORE FRANZEN.
BY
ATTORNEYS.

Patented Nov. 14, 1933

1,934,920

UNITED STATES PATENT OFFICE 1,934,920

BEARING

Tore Franzen, Grosse Pointe Park, Mich., assignor to Chrysler Corporation, Detroit, Mich., a corporation of Delaware Application December 4, 1931. Serial No. 579,001

11 Claims. (Cl. 267—54)

My invention relates to bearings, and it has particular application to bearings of the self-lubricating type requiring a minimum of attention, or adapted for use in inaccessible locations or otherwise subject to but infrequent applications of lubricant thereto.

The object of my invention is to provide a simple and inexpensive bearing of a novel type which will insure a uniform and ample distribution of lubricant thereto during service, and will prevent the waste of lubricant between periods of service, embodying a porous metal bearing member having a novel and particularly efficient means for applying additional lubricant thereto.

More specifically, the immediate object of my invention consists in providing a novel type of bearing adapted for use on spring shackles of motor vehicles which will function properly over long periods of time without any attention whatsoever, which will maintain a small supply of lubricant within the bearing bushing itself, which will prevent the waste of the lubricant during operation of the vehicle, and which will supply additional lubricant to the bearing bushing only during operation of the vehicle, and then only when the supply of lubricant within the bearing bushing is at least partially depleted.

For a better understanding of my invention, reference may be had to the accompanying drawing, of which Fig. 1 is a view, partially in elevation and partially in section of the front end of an automobile chassis illustrating an application of my invention.

Fig. 2 is a vertical cross-sectional view through a spring shackle for automobiles illustrating one embodiment of my invention.

Fig. 3 is a fragmentary view, partially in elevation and partially in cross-section, of a novel type of shackle pin adapted for use in a spring shackle constructed in accordance with my invention.

Fig. 4 is a view, partially in elevation and partially in cross-section, of an assembled bearing sleeve and shackle pin which may be incorporated in my invention.

Fig. 5 is a view, similar to Fig. 4, embodying an additional modification of the assembled bearing sleeve and shackle pin which may be incorporated in my invention.

In the drawing I have illustrated a chassis frame 6, upon which is mounted an ordinary leaf spring 7, by means of a pivotal connection 8 and a spring shackle 9. Centrally mounted upon the leaf spring 7 is a front axle 10 of an automobile on which is mounted an automobile wheel 11.

Referring more particularly to Fig. 2, the spring shackle 9 consists essentially of two side members or links 12, which are identical in construction, to which are secured the front end of the chassis member 6, by means of a shackle pin 13, and the front end of the leaf spring 7 by means of a shackle pin 14. Each shackle link 12 is provided on its inner face, adjacent each end thereof, with a frusto-conical recess or depression 15, the smaller ends of which are closed, and in each of which is rotatably secured a bearing sleeve 16.

The bearing sleeve 16 is composed of a porous metal composition which stores a small amount of lubricant, and through which lubricant readily permeates. A suitable composition for this purpose may be secured by mixing together substantially 87 parts of powdered copper, 10 parts of powdered tin, from 1½ to 2 parts of graphite, and approximately 1 part of stearic acid or some other vaporizable solid or liquid lubricant. This mixture is compressed into a briquette of the shape of the bearing sleeve and is then sintered in a reducing or non-oxidizing atmosphere at a temperature of approximately 1500° F., which causes a bonding of the copper and tin particles and vaporizes the stearic acid, leaving a very porous uniform composition composed of copper and tin having a small amount of graphite uniformly distributed therethrough. This composition is then saturated with oil, or other suitable mobile lubricant, and is then sized by burnishing so as not to destroy the porosity of the surface thereof. It has been found that a composition prepared in this manner is not only porous, but permits the passage of oil therethrough at a uniform rate in all directions and to all portions thereof, and, by capillary action, maintains a uniform amount of lubricant in all portions thereof.

The shackle pin 13, which is fixedly secured in the front end of the chassis frame 6, is provided with a hollow interior, as indicated in 17, for the reception of a body of mobile lubricant, and with tapered end portions 18. The ends of this pin are each provided in an annular groove 19 in the inner periphery adjacent the end thereof, and may be sealed by placing in the groove a closely fitting arched metal disc 20, with the convex side disposed outwardly. By striking this convex side a blow, the outer edges thereof are forced radially outwardly into sealing engagement with the walls of the groove 19. The pin 13 is provided at each end with a lubricant passageway 21, which extends from the hollow interior of the pin to the exterior thereof. These two openings 21 are disposed in the same longitudinal section of the pin and in the tapered end portions 18, providing an open communication between the interior of the pin and the interior of the bushing surface of the bearing member or bushing 16.

In securing the pin 13 to the chassis frame 6, care should be employed to insure that the openings 21 therein are in the uppermost position, and normally above the level of the body of lubricant within the pin. The lubricant within the pin is supplied to the openings 21 each time the car movement is sufficient to cause splashing of the lubricant.

It will be apparent that oscillating movement of the shackle links 12, as the car progresses over a non-uniform surface, causes a restricted rotative movement of the shackle pin 13 with respect to the bearing sleeve 16, or of the sleeve 16 with respect to the side links 12, or both, thus causing a sliding or wiping movement of one surface over the other. As a supply of lubricant is held in each of the openings 21, this body of lubricant is wiped over the inner face of the bearing sleeve 16 upon each rotative movement of the shackle pin with respect to the shackle links. This wiping movement of a supply of lubricant over the porous surface of the member 16 provides an unusually good method of applying lubricant thereto, as the wiping motion of the pin over the bearing surface serves to keep the bearing surface clean, and applies the lubricant over an area materially in excess of the area of the opening 21. As a result, the application of lubricant to the porous bearing member is not interferred with, even if the pores of a small portion thereof be accidentally closed or clogged. Furthermore, the application of the liquid lubricant to this clean surface with a wiping motion, followed by a wiping motion over the same surface by a metal member, that is, by the portion of the pin following the opening in its movement relative to the bearing sleeve, serves to impregnate this bearing surface in a particularly efficient manner. Owing to the permeability of the bearing sleeve 16, the lubricant is carried from that portion of the sleeve over which it is applied through the metal itself to all portions thereof, thus providing a substantially uniform supply of lubricant to all portions and surfaces of the bearing sleeve. Also, it will be apparent that lubricant cannot be wasted, as none is supplied to the openings 21 except when the car is in motion.

As the entire bearing sleeve or bushing 16 is porous and permeable to oil, and as the edge of the larger end thereof is exposed to the air, I prefer to treat the surface of that edge in such manner as to render that surface non-porous or non-permeable. This may be done by dipping the end of the bushing in a solder bath, or by machining the edge surface, or by treating it in any other suitable manner to seal the pores thereof, so as to prevent oil passing therethrough and being wasted.

The shackle links 12 are provided with an interconnecting bolt 22 and a small leaf spring 23, which serve to hold the shackle link on the end of the tapered pin in such a manner that any wear of the bearing sleeve or shackle pin is immediately taken up by means of the resiliency of the spring 23, thus maintaining the shackle links, pins, and bearing bushings in their proper assembled relationship.

Owing to the limited supply of lubricant that can be stored within the shackle pin, it is highly desirable to prevent the waste thereof, and at the same time provide ample lubrication to the bearing surfaces. As the bearing member 16 is porous and permeable to the lubricant, the lubricant travels therethrough by capillary attraction, which assures that all porous surfaces thereof are always maintained in a lubricant moistened condition, and at the same time prevents lubricant from dripping therefrom. As the exposed surface of the edge of the bushing has been rendered non-porous, no lubricant can escape therethrough. As the lubricant deposited in the opening 21, by previous splashing, is under no pressure, it is not forced into the porous bearing bushings, which would force the lubricant therein out, but is absorbed by the bushing only when its internal supply is sufficiently depleted to cause the lubricant to enter by capillary attraction. This arrangement of parts and this method of lubricant feeding entirely eliminates the wastage of lubricant and, at the same time, insures the bearing surfaces ample and uniform lubrication.

The lower shackle pin 14 is likewise hollow and is provided with similar lubricant feeding passageways 21, similarly arranged, which distribute lubricant with a wiping motion to the bearing surfaces of similar bearing sleeves 16. Rigidly mounted upon the pin 14 is a metal sleeve 24, and rigidly secured in the eye of the spring 7 is a second metal sleeve 25 of greater diameter than the sleeve 24. Disposed intermediate the sleeves 24 and 25 is a compressed rubber sleeve 26 which acts as a resilient connection between the spring eye and the pin 14.

In the structure illustrated in Fig. 3 the tapered ends 18 of the pin 13 are provided with the normally vertically disposed lubricant passageways 21. The large opening in the end of the pin is sealed by means of a metal insert 22. This insert may be of cup-shape when first inserted in the end of the pin. The inner part of the side walls may then be expanded, by spinning, into intimate and sealing engagement with the interior wall of the pin, after which the outer edge thereof may be spun into engagement with the end of the pin, as shown. This construction eliminates the necessity of providing a groove in the outer end of the pin, as is necessary in the structure shown in Fig. 2.

In the structure illustrated in Fig. 4, the end of the pin 13 is sealed in any desired manner and is provided with the normally vertically disposed lubricant distributing passageway 21, as previously described. In this modification, the pin 13 is also provided with an annular groove 28 in its exterior surface, which serves to maintain a small arcuate body of lubricant in contact with the inner surface of the sleeve 16 at all times.

In the structure illustrated in Fig. 5, the shackle pin 13 is provided with the usual lubricant passageway 21 and the porous metal bearing sleeve 16 is provided with an annular groove 29 on its interior surface at a point so disposed as to be in continual communication with the lubricant passageway 21, thus providing a passageway and small temporary reservoir for any lubricant passing from the opening 21 to the permeable bearing sleeve 16.

Although I have illustrated several forms of my invention and have described in detail but a single application thereof, it will be apparent to those skilled in the art that it is not so limited but that various modifications and alterations may be made therein without departing from the spirit of my invention or the scope of the appended claims.

What I claim is:

1. In combination, a bearing bushing, a shaft journaled in said bushing and provided with an internal recess for the reception of a body of liquid lubricant, and means for supplying lubricant from said recess to said bearing bushing only during movement of said member.

2. In combination, a bearing bushing composed of porous lubricant permeable metal, a shaft oscillatably journaled in said bushing having an interior recess for the reception of a body of liquid lubricant and provided with a passageway extending from said recess to the surface of said shaft at a point within said bushing, said passageway being disposed in the normally uppermost portion of said shaft above the normal level of the liquid lubricant.

3. In combination, a bearing bushing composed of porous lubricant permeable metal, a shaft journaled in said bushing provided with an internal recess for the reception of liquid lubricant, and means for permitting passage of lubricant from said recess to said bushing during movement of said shaft and for preventing such passage of lubricant when said shaft is idle.

4. In a spring shackle, a shackle link, a bearing sleeve secured therein, a hollow pin journaled in said sleeve and an opening through the uppermost wall portion of said pin disposed within said sleeve, said hollow pin being adapted to serve as a lubricant reservoir and said opening being above the normal level of the lubricant in said pin.

5. In a spring shackle, a hollow cylindrical member closed at both ends and adapted to serve as a lubricant reservoir, a shackle link provided with an internal recess, a porous metal bearing sleeve journaled in said recess, said cylindrical member being journaled in said sleeve and being provided with passageways through the cylindrical wall thereof within said sleeve adapted to wipe lubricant directly over the bearing surface of the sleeve.

6. In a spring shackle, a shackle link provided with a recess, a porous metal bearing sleeve journaled in said recess, a shackle pin journaled in said sleeve, and means for supplying lubricant directly to the bearing surface of said sleeve only during movement of the shackle.

7. In a spring shackle, a shackle link provided with a recess, a porous metal bearing sleeve disposed in said recess, a shackle pin journaled in said sleeve and provided with an internal recess for the reception of a body of lubricant, and a passageway extending through the wall of said pin and interconnecting said recess and the internal surface of said bearing sleeve, said passageway being disposed above the normal level of lubricant in the recess in said pin.

8. In a spring shackle, a shackle link provided with a recess, a porous metal bearing sleeve secured in said recess, and provided with an annular groove in the inner face thereof, a shackle pin journaled in said sleeve and provided with an interior recess for the reception of liquid lubricant, said pin being provided with a passageway through the uppermost wall thereof interconnecting said recess and said groove, said passageway being above the normal level of the lubricant in said recess.

9. In a spring shackle, a shackle link provided with a recess, a porous metal bearing sleeve secured in said recess and provided with a substantially annular groove in its interior face, a shackle pin journaled in said sleeve and provided with an interior recess for the reception of liquid lubricant, said pin being provided with a lubricant passageway extending from said recess upwardly to the surface of said pin at a point adjacent the groove in said sleeve, said passageway being above the normal level of the lubricant in said recess.

10. In a spring shackle, a shackle link provided with a frusto conical recess, a frusto-conical porous metal bearing sleeve secured in said recess, a shackle pin having a tapered end portion journaled in said sleeve and having a hollow interior for the reception of lubricant, said pin having both ends sealed and provided with a passageway extending from said hollow interior to the surface of the tapered end portion.

11. In a spring shackle, a shackle link provided with a frusto conical recess, a frusto-conical porous metal bearing sleeve secured in said recess, a shackle pin having a tapered end portion journaled in said sleeve and having a hollow interior for the reception of lubricant, said pin having both ends sealed and provided with a passageway extending from said hollow interior to the surface of the tapered end portion through the normally uppermost portion of said pin.

TORE FRANZEN.